United States Patent
Vogel et al.

[11] Patent Number: 6,119,972
[45] Date of Patent: Sep. 19, 2000

[54] FLY TYING VISE AND ROTARY MODULE

[75] Inventors: David S. Vogel; Donald E. Vogel, both of Columbus, Ind.

[73] Assignee: Anvil Industries, Inc., Columbus, Ind.

[21] Appl. No.: 09/150,438

[22] Filed: Sep. 9, 1998

[51] Int. Cl.$^7$ .......................... B21C 47/02; B65H 81/06
[52] U.S. Cl. ...................... 242/443; 269/219; 269/221; 269/243; 269/907
[58] Field of Search .................. 242/448, 446, 242/443; 43/42.53, 1; 269/221, 242, 907, 216, 219, 240, 243, 256

[56] References Cited

U.S. PATENT DOCUMENTS

| | | | |
|---|---|---|---|
| 2,489,547 | 11/1949 | Temple | 242/448 X |
| 2,599,174 | 6/1952 | Hauser | 269/221 X |
| 4,134,577 | 1/1979 | Price et al. | 269/71 |
| 4,169,562 | 10/1979 | Renzetti | 242/446 |
| 4,216,948 | 8/1980 | Carter | 269/71 |
| 4,322,065 | 3/1982 | Doiron | 269/907 X |
| 4,375,284 | 3/1983 | Doiron | 269/907 X |
| 4,544,145 | 10/1985 | Norlander | 242/443 X |
| 4,969,636 | 11/1990 | Cautam | 269/907 X |
| 5,165,673 | 11/1992 | Newton, Jr. | 43/1 |
| 5,169,079 | 12/1992 | Renzetti | 242/446 |
| 5,716,020 | 2/1998 | Shuts | 242/443 |

*Primary Examiner*—Donald P. Walsh
*Assistant Examiner*—Emmanuel M. Marcelo

*Attorney, Agent, or Firm*—McAndrews, Held & Malloy, Ltd.

[57] ABSTRACT

A vise for holding objects wherein the vise includes a vise portion having a pair of engagement jaws mounted on one end of a vise body. An adjusting shell is disposed in coaxial relation about the vise body and in cooperative relationship with the engagement jaws. The adjusting shell is rotatable about the vise body, and rotation of the adjusting shell actuates the engagement jaws between their opened and closed positions. The vise portion can be used in conjunction with a rotary module which is mounted to the other end of the vise body and imparts a rotary motion to the vise body about its central longitudinal axis. The rotary module employs a clutch and brake assembly that is mounted on a rotary spindle and housed within an adjusting shell that is coaxial with the rotary spindle. The adjusting shell is slideable backward and forward relative to the rotary spindle to engage and disengage the brake. When the brake is disengaged, the rotary module can be rotated either clockwise or counter-clockwise. The vise also includes an adjustable clamp portion for clamping the vise portion to an overhanging edge of a work surface. The clamp portion includes a body member and two support arms removably mounted thereon. The support arms can be mounted at different locations on the body member to allow the clamp portion to be clamped to surfaces of different thicknesses. The vise is particularly suited for holding a fishhook for fly-tying operations.

19 Claims, 5 Drawing Sheets

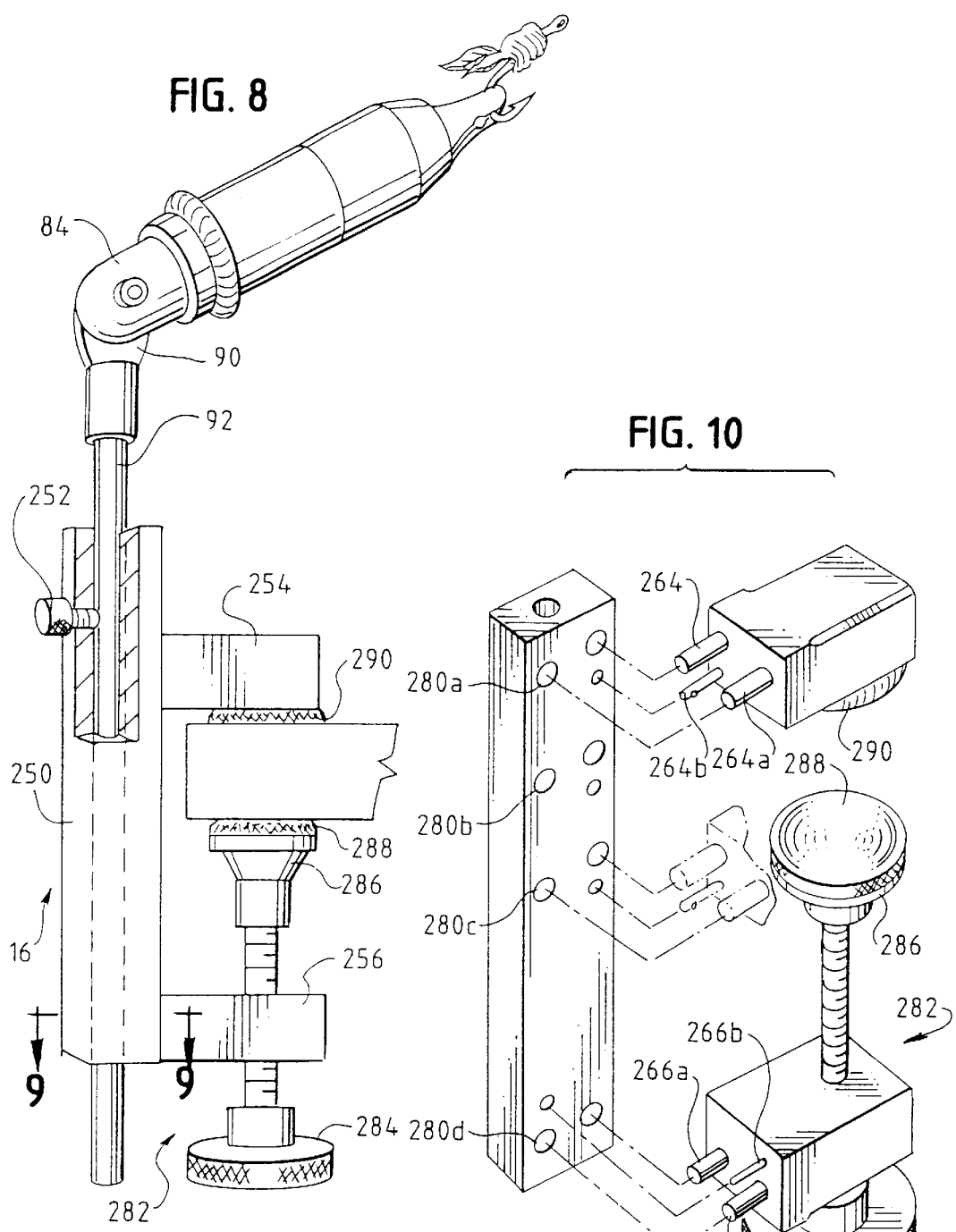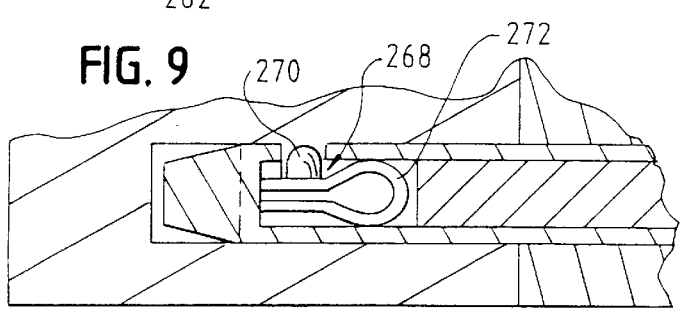

FLY TYING VISE AND ROTARY MODULE

BACKGROUND OF THE INVENTION

The present invention is directed to a vise for holding objects. It is particularly useful for holding small objects such as fishhooks or other similar objects upon which various materials are tied or fastened to make artificial flies and fishing lures.

Fishermen have long used artificial flies as fishing lures in fly casting. Such artificial flies are typically made by hand tying hairs, feathers, and other materials to a fishhook to simulate a real insect. In order to free up both hands for holding and tying the hair and feathers, fishing enthusiasts often employ a clamp or vise to hold the fishhook in the desired position. There are many different designs of fly tying vises available. In general, the vises employ adjustable hook-holding jaws that are loosened or tightened by means of thumb screws or nuts. In some cases, the jaws may be rotatable to allow the enthusiast to see or work on other areas of the artificial fly.

One difficulty with fly tying devices is designing a jaw arrangement that is easily adjustable so that it can fixedly hold fishhooks of varying sizes. Many prior art devices employ thumb screws or levers to open and close the jaws. While such adjustment mechanisms work fairly well, they can be cumbersome to use. It can also be somewhat difficult with these mechanisms to determine the right amount of jaw tension needed to securely hold the fishhook without crushing or damaging the hook.

Another difficulty in designing fly tying vises is ensuring that the jaws always remain parallel to each other with no misalignment to enable a wide range of fishhook sizes to be held securely there between with no slippage and without crushing the smallest fishhooks.

A further difficulty with fly tying devices is designing a jaw arrangement that can accommodate a full range of fishhook sizes, i.e. from #10/0 down to #32. Prior art vises typically accommodate only a partial range of fishhook sizes, or require that different jaws of different sizes or shapes be interchanged to accommodate a wide range of hook sizes.

Often fly tying vises are primarily designed for either stationary tying or rotary tying, but not both, requiring a fishing enthusiast to purchase two vises—one for standard stationary tying and one for rotary tying—in order to employ the full range of fly tying techniques.

Another difficulty with many prior art vises is that the table clamp portions of the vises have limited openings and can therefore only accommodate a narrow range of tabletop thicknesses. Vises that can accommodate a wide range of tabletop thicknesses often employ a relatively long adjusting shaft that can become easily bent or damaged.

The present inventor has designed a fly tying device that is intended to address these and other difficulties with prior art fly tying devices.

SUMMARY OF THE INVENTION

The present invention comprises a vise suitable for holding small objects, especially fishhooks which are being prepared into artificial lures. The vise includes a vise body having an adjustable jaw assembly at one end thereof for releasably clamping the fishhook. The jaw assembly includes separate jaw members that always remain parallel to each other as the jaw members are opened and closed. An adjusting shell is disposed in coaxial relation about the body and in threaded engagement therewith. Rotation of the adjusting shell about the body causes the adjusting shell to operatively engage the jaw assembly so that rotation of the adjusting shell in one direction causes the jaws of the jaw assembly to open, and rotation in the opposite direction causes the jaws to close.

The vise body is mounted on an elongate shaft, which in turn is mounted on or affixed to a support for supporting the shaft in a vertical position. Although the support may be a base or a pedestal, another feature of the present invention is an adjustable table clamp portion that can be easily adjusted to accommodate tabletops of varying thickness. The table clamp portion includes a body member having two support arms removably mounted thereon. The support arms can be mounted at different locations on the body member to enable the clamp portion to be clamped to surfaces of different thicknesses. One of the arms includes an adjustment mechanism which bears against a surface of the tabletop to create a bind and thereby hold the clamp portion in a fixed position on the tabletop.

Another feature of the present invention is a rotary module that can be easily attached to the vise body and to the elongate shaft when it is desirable to have a vise that allows for rotary tying. The rotary module employs a clutch and disk brake that holds the vise in any position needed for tying. The clutch and disk brake assembly is mounted on a rotary spindle and housed within an adjusting shell that is coaxial with the rotary spindle. The adjusting shell is slideable backwards and forwards relative to the rotary spindle to engage and disengage the brake. The adjusting shell is also operatively connected to the drive mechanism for the rotary module so that rotation of the adjusting shell about its longitudinal axis imparts a rotary motion to the rotary spindle which, in turn, rotates the vise portion about its longitudinal axis. When the disk brake is disengaged, the rotary module can be rotated either clock-wise or counterclock-wise.

One object of the present invention is to provide a fly-tying vise that has easily adjustable jaws that can accommodate a full range of fishhook sizes.

Another object of the invention is to provide a fly-tying vise that can securely hold fishhooks of varying sizes without slippage and without crushing the fishhook.

A further object of the invention is to provide a fly-tying vise that has jaw members that remain parallel to each other as the jaws are opened and closed in order to engage and securely hold a full range of fishhook sizes.

A still further object of the invention is to provide a fly-tying device that has an adjustable surface-clamping portion.

Another object of the invention is to provide a surface-clamping portion that can be easily adjusted for a wide range of tabletop or other surface thicknesses.

Another object of the invention is to provide a fly-tying vise that can be easily converted into a fully rotatable vise to facilitate rotary tying of a fly.

A further object of the present invention is to provide a rotary module that easily attaches to the fly-tying vise.

A still further object of the invention is to provide a rotary module for a fly-tying vise that can easily lock the vise into any rotatable position about a longitudinal axis.

These and other objects and advantages of the invention will become apparent to those skilled in the art upon examination of the following description of the invention in conjunction with the accompanying drawings.

BRIEF DESCRIPTION OF THE DRAWINGS

FIG. 8 is a side view of the vise portion and the clamp portion of the present invention, illustrating the vise portion in a stationary tying mode.

FIG. 9 is a cross-sectional view taken along line 9—9 of FIG. 8.

FIG. 10 is an exploded view of the clamp portion of the present invention.

DETAILED DESCRITPTION OF EMBODIMENTS OF THE INVENTION

Figure 1:
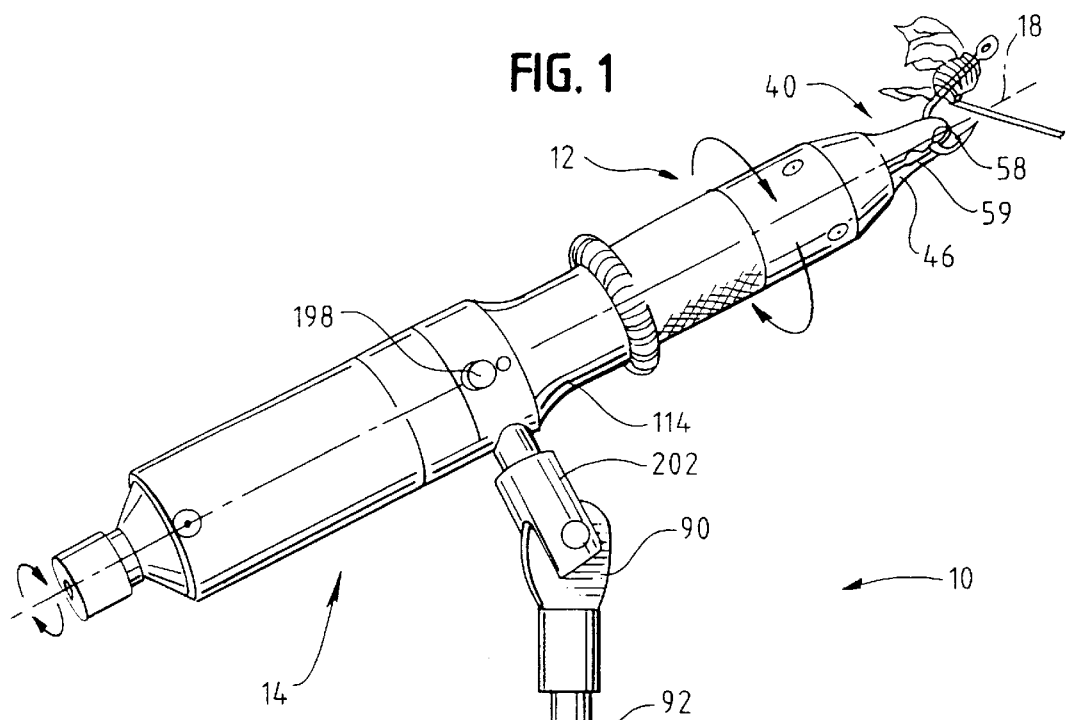
FIG. 1 is a perspective view of a fly-tying vise of the present invention showing a fishhook clamped within a first groove in the jaws of the vise portion.

FIG. 1 illustrates a vise, shown generally at 10, for holding objects, especially small objects such as a fishhook. The vise 10 includes a vise portion 12 having a jaw assembly 40 with engagement jaws 46 for securely gripping a fishhook. The vise portion 12 is removably coupled to a rotary module portion 14, which imparts a rotary motion to the vise portion 12 about its central longitudinal axis 18. As will be described further herein, the vise portion 12 can be used without the rotary module portion (see FIG. 8) if it is desired to have a completely stationary vise portion. The vise 10 further includes an adjustable clamp portion 16 for supporting the vise portion 12 in a raised position above a tabletop or other surface. Each of these portions will now be described in further detail.

Vise Portion

Figure 3:
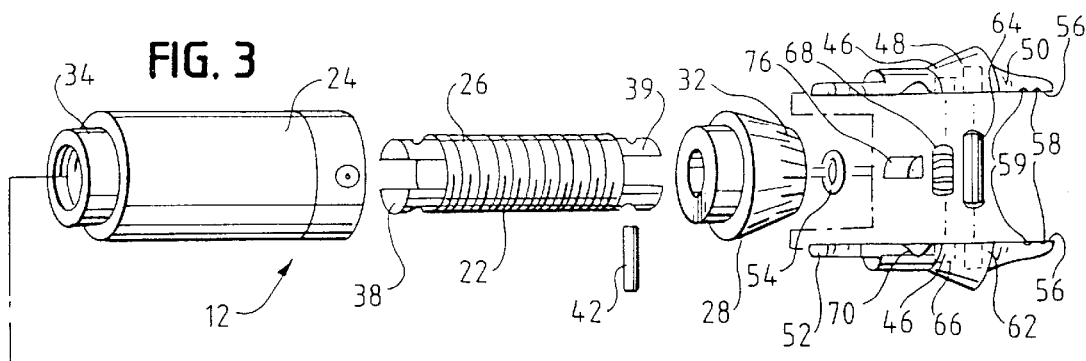
FIG. 3 is an exploded view of the vise portion and the rotary module of the present invention.
Figure 3:
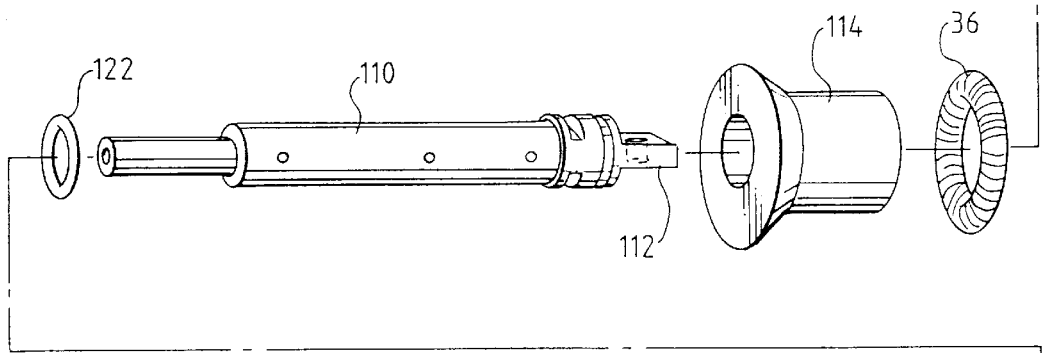
Figure 3:
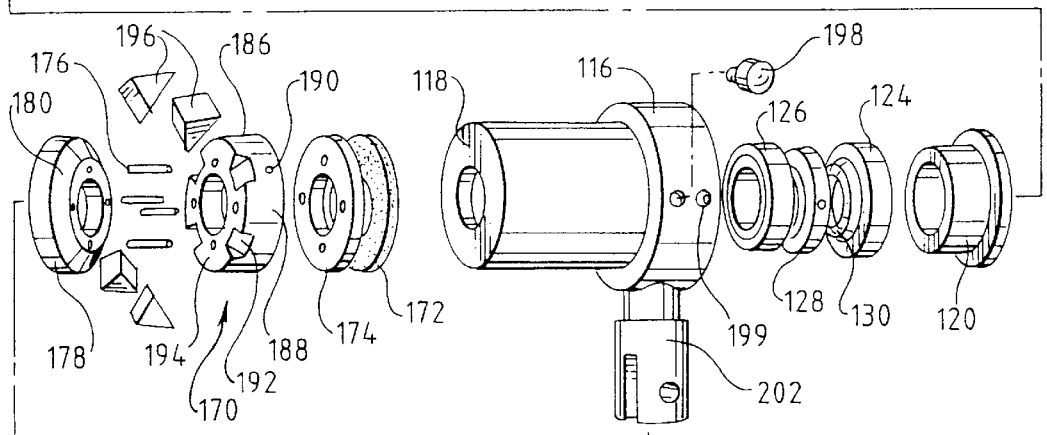
Figure 3:
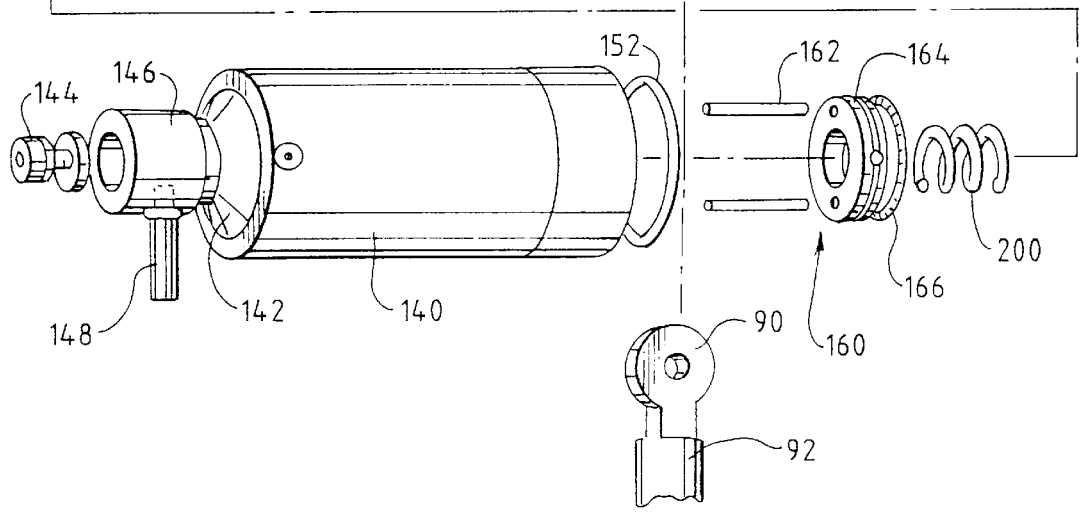
Figure 4:
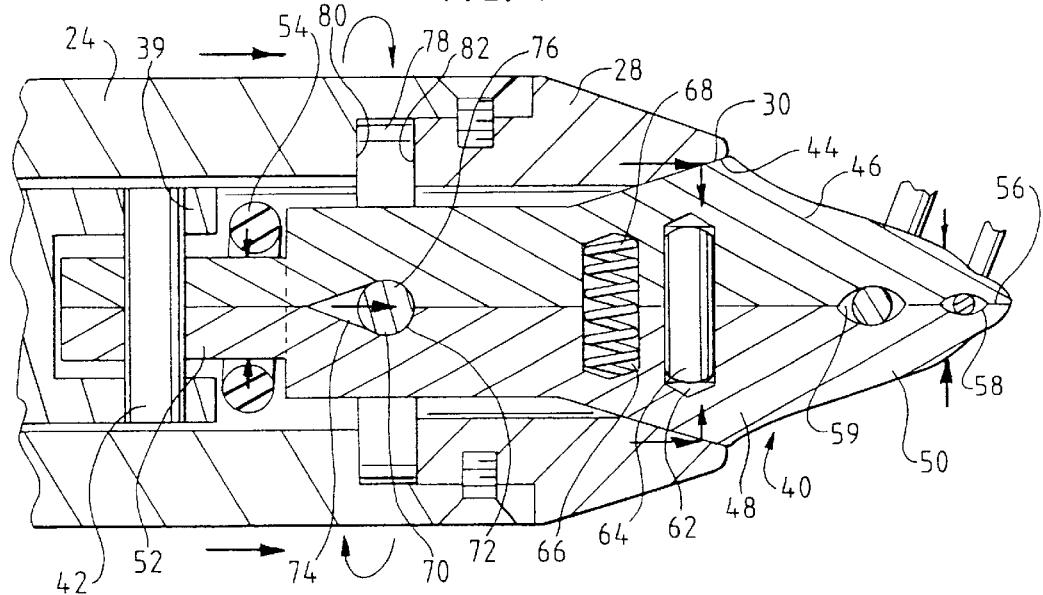
FIG. 4 is a cross-sectional view of a portion of the vise portion of the present invention, illustrating the vise portion in a closed position.
Figure 5:
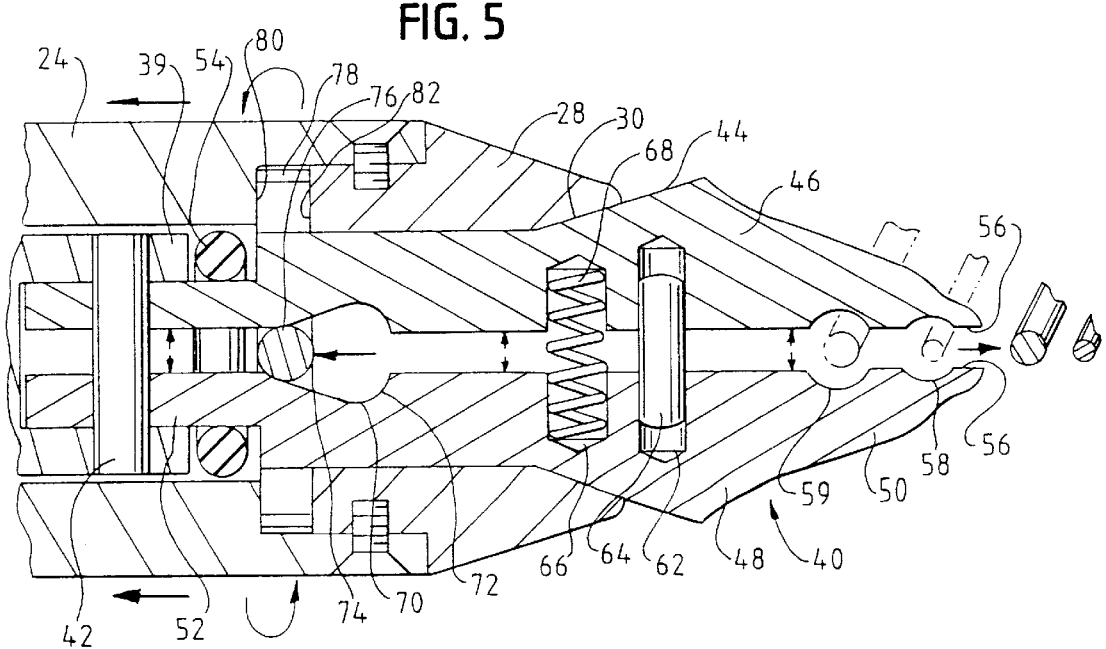
FIG. 5 is a cross-sectional view of a portion of the vise portion of the present invention, illustrating the vise portion in an open position.

Referring to FIGS. 3, 4 and 5, the vise portion 12 includes an adjusting spindle 22 that is received within and co-axial with a knurled adjusting shell 24. The spindle has external threads 26 that cooperatively mate with internal threads on the adjusting shell 24 so that the adjusting shell can rotate about the spindle and move forward and backward relative to the spindle. A tapered shell nose 28 is mounted on the forward end of the adjusting shell 24 and rotates therewith. The shell nose has a central bore which has an internally tapered surface 30 that abuts against a complementary tapered surface 44 on the engagement jaws. The shell nose is preferably provided with graduations 32 equidistantly spaced about its external surface. These graduations enable a user to determine and measure the general pressure exerted by the jaws on the object as the adjusting shell 24 is rotated about the spindle 22 and its central longitudinal axis 18. The rear end of the adjusting shell has an annular shoulder 34 which receives a material clip 36 in the form of a circular extension spring. The material clip holds feathers, threads, etc. that are used during the tying operation, as is well known in the art.

The spindle 22 has a slotted tail end 38 and a slotted forward end 39. The forward end 39 of the spindle is connected via a connecting pin 42 to a jaw assembly 40.

The jaw assembly includes a matched pair of jaws 46 that are movable away from and toward each other to receive and hold the fishhook or other object. The jaws have a central body section 48, a tapered nose section 50 that projects from one end of the body section and a tail section 52 that extends from the other end of the central body section 48. The jaw tail section 52 is dimensioned so as to be received within the slotted forward end 39 of the spindle and provide a clearance between the jaw tail section 52 and the slotted end 39 when the jaws are closed, as illustrated in FIG. 4. This clearance provides space for the jaw tail sections to move apart from each other as the engagement jaws are opened, as illustrated in FIG. 5. The jaw tail section is provided with a bore that receives the connecting pin 42 to connect the jaw assembly to the spindle body. An o-ring spring 54 is mounted on the tail section 52 to maintain a slight tension on the tail of the jaws to keep the jaws together.

Figure 2:
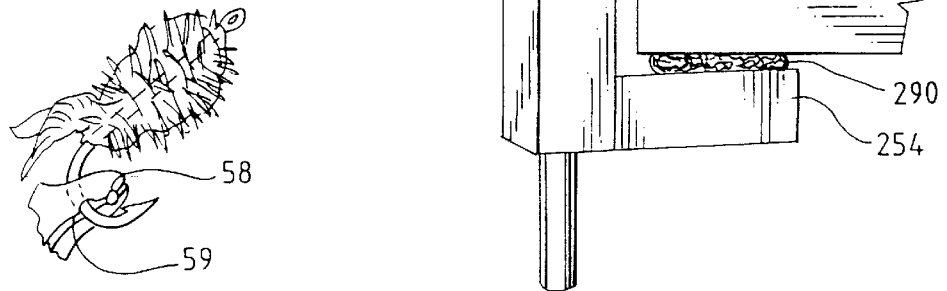
FIG. 2 is a detailed view of the jaws of the vise portion showing a fishhook clamped within a second groove in the jaws of the vise portion.

The jaw nose section 50 has flatted confronting clamping surfaces 56 that mate with each other to retain the fishhook therebetween. The clamping surfaces can be provided with matched transverse arcuate grooves 58 and 59 of differing depths to accommodate and receive fishhooks of different sizes, as illustrated in FIG. 2 and FIG. 4. The grooves enable a fishhook to be more easily positioned between the jaws and prevent the fishhook from rolling or slipping when held within the jaws. Fishhooks having a diameter too small to fit securely within one of the grooves 58 or 59 can be grasped securely between the clamping surfaces 56 at the tip of the jaw nose section.

The body section 48 of the engagement jaws has a first bore 62 which receives an alignment pin 64. The alignment pin 64 is perpendicular to the clamping surfaces and serves to keep the clamping surfaces 56 parallel to each other so that the surfaces do not create a "scissoring" action which can damage the fishhook or cause it to slip or move between the clamping surfaces. A second bore 66 is positioned adjacent to and aligned with the first bore 62 and receives a spreader spring 68 that helps to keep the jaws in an open position, as illustrated in FIG. 5.

Rearward of the second bore 66 is a teardrop shaped fulcrum groove 70 having an arcuate portion 72 and an angled portion 74. The arcuate portion of the fulcrum groove seats a fulcrum pin 76, the ends of which protrude transversely from the engagement jaws into a pin retaining groove 78. The pin retaining groove is defined by an interior shoulder 80 on the adjusting shell and the end wall 82 of the shell nose. When actuated, the fulcrum pin can unseat from the arcuate portion of the fulcrum groove and slide transversely across the angled portion of the groove, as will be further explained.

When the vise portion is in its closed position, as illustrated in FIG. 4, the shell nose 28 is in its forwardmost position and the fulcrum pin 76 is seated within the arcuate portion 72 of the fulcrum groove 70. In this position, the shell nose 28 exerts a force on the jaws 46 that squeezes the jaws together, causing the clamping surfaces to mate and securely hold a fishhook therebetween.

To open the jaws 46, the adjusting shell 24 is rotated on the external threads of the adjusting spindle, causing the adjusting shell and the shell nose 28 to move rearwardly relative to the spindle 22, as shown in FIG. 5. Because the shell nose 28 and the jaws 46 have complementary tapered surfaces 30 and 44, respectively, there is an increase in diameter of the shell nose tapered surface 30 relative to the tapered surface 44 as the shell nose 28 is moved rearwardly. This relative increase in diameter allows the spreader spring 68 to move the jaws apart. At the same time, as the shell nose moves rearwardly, the shoulder 82 of the shell nose pushes against the ends of the fulcrum pin 76, causing the fulcrum pin to unseat from the arcuate portion 72 of the groove 70 and slide onto the angled portion 74. This movement of the fulcrum pin 76 creates a force that overcomes the tension exerted by the o-ring spring 54 on the tail section of the jaws which also helps to move the jaws apart.

One of the unique features of the jaw assembly is that the angle of the angled portion 74 of the fulcrum groove and the angle of the tapered surface 30 of the shell nose 28 are the same, as illustrated in FIGS. 4 and 5. Because the shell nose surface 30 and the angled portion 74 of the fulcrum groove have the same angle of taper, and because the fulcrum pin 76 moves by the exact amount that the shell nose 28 moves, a decrease in the force exerted by the shell nose is offset by an equal but increasing force exerted by the fulcrum pin. This equal but opposite change in force insures that the jaws will always stay parallel to each other as the jaws are opened and closed.

The slotted tail end of the body can be pivotally connected to an end extension 90 of an elongate shaft 92 (see FIG. 8). A split end cap 84 can be fitted over the slotted tail end to provide a nice smooth appearance to the vise portion. The elongate shaft is securely fastened to a base, such as a pedestal base (not shown) or the tabletop clamp shown generally at 16, so that the vise is supported above a tabletop or other work surface to permit the stationary tying of flies.

If it is desired to use rotary tying techniques, the vise can easily be converted into a rotary tying vise by coupling the vise portion 12 to the rotary module portion 14 of the present invention.

Rotary Module

Figure 6:
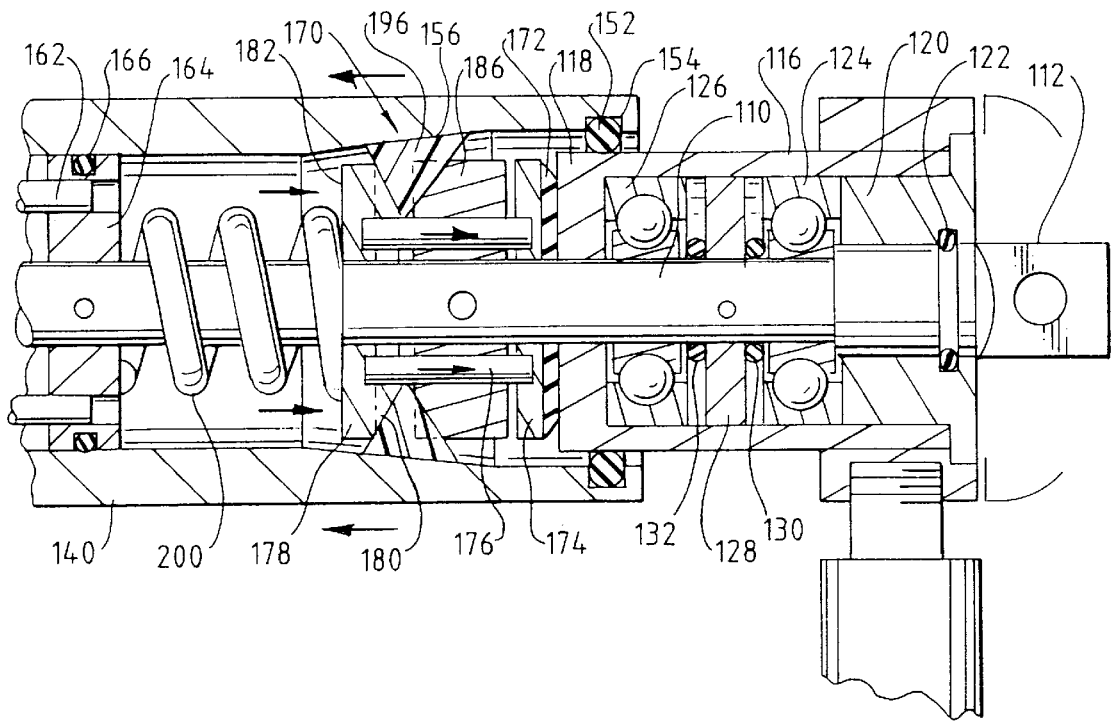
FIG. 6 is a cross-sectional view of a portion of the rotary module of the present invention, illustrating the rotary module in a braked position.
Figure 7:
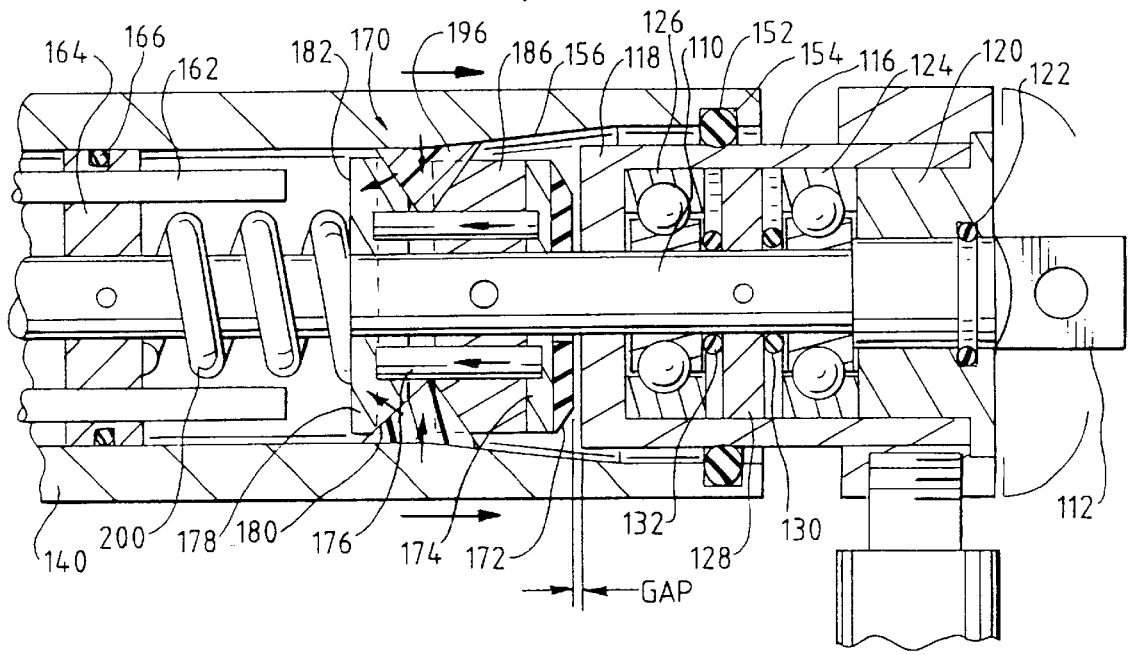
FIG. 7 is a cross-sectional view of a portion of the rotary module of the present invention, illustrating the rotary module in its rotating mode.

The rotary module is shown in detail in FIGS. 3, 6 and 7. The rotary module comprises a rotary spindle 110 having a tab extension 112 on one end thereof. The tab extension is machined to fit within the slotted tail 38 of the adjusting spindle 22 and is securely fastened thereto by means of a screw or bolt or other fastening device to operatively connect the rotary module 14 to the vise portion 12. When the rotary module is connected to the vise portion, the split end cap 84 of the vise portion is not used. Instead, a connector cap 114 (see FIG. 1) sits over the connection between the vise portion and the rotary module to give a nice, smooth appearance to the connected modules and align the vise head to the rotary module to maintain concentricity.

Mounted on the rotary spindle 110, adjacent the tab extension 112, and co-axial with the rotary spindle, is a bearing retainer 116. The bearing retainer has an integral rear wall 118 through which the rotary spindle passes. At its forward end, the bearing retainer has a bearing cap 120 mounted thereon which carries an o-ring 122 to seal the rotary spindle. The bearing retainer 116, together with its rear wall 118 and the bearing cap 120 define an interior space within which is housed ball bearings 124 and 126 separated by a pre-load spacer 128. The pre-load spacer 128 is fixed to the rotary spindle 110 by means of a pin or other fastening device. Each end of the pre-load spacer 128 carries an o-ring 130, 132 to elastically pre-load the ball bearings 124, 126 respectively. A slight tension is imparted to the ball bearings by the bearing cap 120 compressing the o-rings so as to minimize the play between the ball bearings and the interior of the bearing retainer.

A knurled cylindrical activating shell 140 is disposed about the rotary spindle in spaced concentric relationship therewith. One end of the activating shell receives an end cap 142, which is connected by means of a screw cap 144 or other fastening means to the end of the rotary spindle 110. The end cap 142 is provided with a knurled extension knob 146 that permits high precision turning of the rotary spindle. Additional control over the rotary motion can be achieved by use of a lever 148 removably secured to the extension knob. One mechanism for securing the lever comprises providing the lever with screw threads which mate with an internally threaded bore on the extension knob.

The other end of the activating shell is dimensioned to slide over and receive the bearing retainer 116. An o-ring seal 152 is disposed within a groove 154 on the inside surface of the activating shell to seal the connection between the activating shell 140 and the bearing retainer 116. As best illustrated in FIG. 6, the inside diameter of the activating shell gradually decreases to form a bearing surface 156, that acts on a clutch and brake assembly shown generally at 170, as will be further explained in detail.

The activating shell 140, the end cap 142, and the bearing retainer 116 define an interior chamber in which is housed a drive mechanism, shown generally at 160, and the clutch and brake assembly 170. The drive mechanism includes a pair of drive pins 162 having one end thereof permanently affixed to the end cap 142, and the other end thereof slidingly received by and extending through apertures in a drive plate 164. The drive plate 164 is permanently affixed to the rotary spindle by means of a drive pin or other fastening device. An O-ring 166 is disposed within a circumferential groove on the drive plate to compensate for any misalignment of the drive pins 162 through the drive plate 164. Thus, the drive plate 164, together with the drive pins 162 complete the physical connection between the activating shell 140 and the rotary spindle 110, so that rotation of the activating shell about its central longitudinal axis causes the rotary spindle to rotate about its longitudinal axis.

The clutch and brake assembly, shown generally at 170, is mounted on the rotary spindle 110, adjacent to the bearing retainer 116. The clutch and brake assembly includes an elastomeric brake pad 172 disposed between the rear wall 118 of the bearing retainer 116 and a disk-shaped brake rotor 174. The brake rotor is spaced apart from and permanently attached via a plurality of coupling pins 176 to a brake actuator 178. The brake actuator has an angled annular surface 180 on one side face thereof and its opposite side face comprises a spring force transmitting surface 182.

Disposed between the brake rotor and the brake actuator is a pin guide 186 having apertures axially aligned with the coupling pins 176 and dimensioned to slideably receive the coupling pins. The circumferential surface 188 of the pin guide is provided with a radially extending bore 190 which receives a drive pin (not shown) for pinning the pin guide 186 to the rotary spindle 110. Thus, the axial positions of the brake rotor 174 and the brake actuator 178 are fixed relative to each other, but are moveable with respect to the pin guide 186 and the rotary spindle 110, while the axial position of the pin guide is fixed relative to the rotary spindle.

Equidistantly spaced about the circumferential surface 188 of the pin guide 186 are angled notches 192 that extend through the intersection of the circumferential surface and the side face 194 adjacent to the brake actuator. The angle of the notches 192 is the same as the angle of the annular surface 180 of the brake actuator so that together, the notches and the annular surface form wedge-shaped spaces. Within each wedge-shaped space is seated a resilient activating wedge 196. The activating wedges are made of nylon or other resilient material.

The activating wedges are slightly larger than the wedge-shaped spaces defined by the notches 192 and the annular surface 180 of the brake actuator 178 so that their outside edges extend beyond the circumferential surface of the pin guide 186. Although four activating wedges are shown, it will be appreciated that another number of wedges, such as two or more, could be employed. It should also be appreciated that shapes other than wedges could be employed, such as balls, for example.

A coil spring 200 is disposed about the rotary spindle 110 between the brake actuator 178 and the drive plate 164 so that one end of the spring rests against the drive plate, while the other end presses against the spring force transmitting surface 182. The force exerted by the coil spring 200 on the spring force transmitting surface 182 is transmitted through the brake actuator 178 and the brake rotor 174, causing the brake rotor to urge the brake pad 172 into engagement with the rear wall of the bearing retainer 116, as illustrated in FIG. 6. In this position, with the brake pad engaged, the rotary module is in a fixed position and will not rotate.

Disengagement of the brake pad is accomplished by simply sliding the actuating shell 140 forward, toward the vise portion, in the direction of the arrows shown in FIG. 7. Sliding the actuating shell causes the inside bearing surface 156 to bear against the activating wedges 196, forcing the wedges to slide radially inwardly. This action overcomes the force exerted by the coil spring 200 on the brake actuator 178 and forces the brake actuator and connected brake rotor 174 to shift in an axial direction away from the bearing retainer 116. This shift in axial position causes the brake pad 172 to disengage, thereby allowing free rotary movement of the rotary module in either a clockwise or a counter-clockwise direction.

In order to engage the brake, the activating shell 140 is simply slid rearward, in the direction of the arrows shown in FIG. 6. Sliding the activating shell rearwardly allows the larger diameter portion of the inside surface of the activating shell to reduce the force bearing on the activating wedges 196. This reduction in force allows the force of the coil spring 200 to act on the brake actuator 178 which causes the activating wedges 196 to be squeezed radially outwardly from the grooves. The brake actuator 178 and the brake rotor 174 then shift axially toward the bearing retainer 116, thus causing the brake pad 172 to be squeezed between the brake rotor 174 and the rear wall 118 of the bearing retainer, thereby engaging the brake.

A locking screw 198 (See FIGS. 1 and 3) can be mounted on the bearing retainer to provide a positive full locking mechanism for the rotary spindle. The locking screw 198 extends through the bearing retainer and the end cap to fully lock the rotary spindle in specific rotary positions for mounting the fishhook in or demounting the fishhook from the vise portion. The amount of friction or drag on the rotary spindle can be adjusted by a friction or drag screw 199, which is also mounted on and extends through the bearing retainer.

The rotary module includes a split rod mount 202 attached to the bearing retainer for mounting the rotary module on the end extension 90 of the elongate shaft 92 as illustrated in FIG. 1. The shaft is fastened to a base, such as the clamp portion 16 of the present invention, to support the vise portion and rotary module above a work surface to enable the tying of flies.

Clamp Portion

Referring now to FIGS. 8, 9, and 10, the clamp portion 16 includes a clamp body 250 having a bore there through which slideably receives the elongate shaft 92. The height of the shaft within the clamp body can be adjusted by means of a thumb screw 252 mounted on the clamp body. First and second clamping arms 254 and 256, respectively are removably mounted to the clamp body and extend outwardly therefrom for clamping opposed surfaces of an overhanging edge of a tabletop or other surface.

The clamping arms 254 and 256 are each provided with mounting means comprising a set of pins 264 and 266, respectively, for mounting the clamping arms to the clamp body. Each set of pins includes holding pins 264a and 266a, respectively, and a detent pin 264b and 266b, respectively, for securing the clamp body. The pins 264 and 266 are dimensioned and aligned so that they can be received within a corresponding set of apertures on the claim body. Each detent pin 264b and 266b has a detent mechanism 268 that permits the respective clamping arm to be removably secured to the clamp body.

The detent mechanism includes an outwardly projecting ball 270 in operative engagement with an elastomeric member 272 positioned within the detent pin. As the detent pin is inserted into its respective aperture on the clamp body, the aperture wall forces the ball 270 to retract into the detent pin, as illustrated in FIG. 9. Pressure from the elastomeric member 272 on the ball forces the ball into engagement with the aperture wall, thereby securing the clamping arm to the body portion 250. Pulling the clamping arm away from the body overcomes the force of the detent ball against the aperture, allowing the clamping arm to be removed.

Preferably, the clamp body has multiple sets of apertures 280, such as first, second, third, and fourth sets of apertures 280a, 280b, 280c and 280d, respectively. Each set of apertures can receive the pins from either the first clamping arm 254 or the second clamping arm 256, to permit maximum adjustability of the clamp portion, as will be further explained herein. Although each clamp arm is depicted as having a pair of holding pins and a detent pin, it will be appreciated that other numbers of pins could be employed to secure the clamping arms to the clamp body, including a single detent pin. It will also be appreciated that the clamp body can be provided with the mounting pins and that the clamping arms can be provided with the apertures for receiving the mounting pins.

Near the outer end of clamping arm 256 is a take-up mechanism 282. The take-up mechanism includes a knurled thumb screw 284 threaded through the clamping arm 256 generally parallel to the clamp body when the clamping arm is secured to the clamp body. Mounted on the end of the thumb screw 284 is a bearing member 286 carrying a bearing disc 288 which bears against a surface of the tabletop. Clamping arm 254 also carries a bearing disc 290, which bears against the opposite surface of the tabletop.

From FIGS. 8 and 10 it will be apparent that the clamp portion can be easily clamped to a tabletop by placing clamping arm 254 against the top surface of the tabletop and then screwing the bearing disc 288 into engagement with the underside of the tabletop to create a bind that firmly holds that clamp in position against the tabletop.

With clamping arm 254 inserted into apertures 280a and clamping arm 256 inserted into apertures 280d, as illustrated in FIG. 10, the clamp portion will accommodate tabletop surfaces of about 2 to 3 inches in width. The clamp portion can be easily adjusted to accommodate surfaces thinner than 2 inches by moving clamping arm 254 to either apertures 280b or 280c. The clamp portion can also be adjusted to a low-profile mode when it is desirable to have the vise portion low to the tabletop surface. In this mode, the clamp body is inverted, clamping arm 254 is inserted into apertures 280d and clamping arm 256 is inserted into apertures 280a, 280b, or 280c, depending upon the width of the tabletop surface. Clamping arms 254 and 256 can also be reversed, so that bearing disc 288 bears against the top surface of a tabletop and bearing disc 290 bears against the underside of a tabletop as illustrated in FIG. 1. In this position the clamping portion can be clamped to a table or desk allowing use of the top drawer.

Numerous modifications may be made to the foregoing device without departing from the basic teachings thereof. Although the present invention has been described in substantial detail with reference to one or more specific embodiments, those of skill in the art will recognize that changes may be made thereto without departing from the basic teachings. For example, the present invention could have numerous applications for holding small objects other than fishhooks, such as parts for making jewelry or for gun-making. The present invention is also not limited in the size of objects that can be held in the vise, and it is specifically contemplated that the present invention can be adapted for industrial applications, such as holding machine parts for hand polishing and fitting operations. All such embodiments and modifications are intended to be considered within the scope and spirit of the invention which is limited only by the following claims.

What is claimed is:

1. A vise for holding objects comprising:

a vise body having a proximal end and a distal end and a central longitudinal axis;

engagement jaws mounted on the distal end of the body, the engagement jaws being moveable between an open object-receiving position and a closed object-holding position, the engagement jaws remaining parallel to each other as they are moved between their open and closed positions;

an adjusting shell disposed in coaxial relation about the body and in cooperative relationship with the engagement jaws, the adjusting shell being rotatable about the central longitudinal axis to actuate the engagement jaws, whereby when the adjusting shell is rotated in one direction, the engagement jaws are moved to their open object-receiving position, and when the adjusting shell is rotated in the opposite direction, the engagement jaws are moved to their closed object-holding position; and mounting means attached to the vise body for supporting the vise in a raised position above a work surface.

2. The vise according to claim 1 wherein the mounting means comprises an elongate shaft having a first end attached to the vise body and a second end attached to a base for supporting the shaft in a vertical position.

3. The vise according to claim 2 wherein the base comprises a clamp for securing the vise to an overhanging edge of the work surface.

4. The vise according to claim 3 wherein the clamp comprises:

a clamp body slideably receiving the second end of the shaft therewithin;

first and second clamping arms removably mounted to the clamp body in opposed parallel relationship with each other and extending outwardly from the clamp body, each of said clamping arms having a table-confronting face;

a bearing member projecting outwardly from the table-confronting face of said first clamping arm; and a take-up means operatively connected to the bearing member for adjusting the height of the bearing member relative to a surface of the overhanging work surface edge and for bringing the bearing member into engagement with the work surface to cause said clamping arms to clamp the work surface.

5. A vise according to claim 1, wherein the engagement jaws have confronting faces and the confronting faces are provided with at least one complementary transverse arcuate groove for receiving and securely holding an object.

6. A vise according to claim 1, wherein the adjusting shell includes a tapered surface which engages a complementary tapered surface on the engagement jaws to urge the jaws into their closed object-holding position.

7. A vise according to claim 6, wherein the engagement jaws include a transverse groove having a tapered portion for receiving a fulcrum pin, the fulcrum pin being slideable across the tapered portion to urge the jaws into their open object-receiving position.

8. A vise according to claim 7, wherein the fulcrum pin includes pin ends that project transversely outwardly of the engagement jaws and which are engaged by the adjusting shell so that, as the adjusting shell is rotated in the one direction, it moves the fulcrum pin across the tapered portion thereby urging the jaws into their open object-receiving position.

9. A vise according to claim 1, further including a rotary module mounted to the proximal end of the vise body for imparting rotary motion to the vise body about its central longitudinal axis.

10. A rotatable vise for holding small objects such as a fishing hook comprising:

a vise body having a proximal end and a distal end and a central longitudinal axis;

hook engagement jaws mounted on the distal end of the body, the hook engagement jaws being moveable between an open hook-receiving position and a closed hook-holding position, the hook engagement jaws remaining parallel to each other as they are moved between the open and closed positions;

an adjusting shell disposed in coaxial relation about the body and in cooperative relationship with the hook engagement jaws, the adjusting shell being rotatable about the central longitudinal axis to actuate the hook engagement jaws, whereby when the adjusting shell is rotated in one direction, the hook engagement jaws are moved to their open hook-receiving position and when the adjusting shell is rotated in the opposite direction, the hook engagement jaws are moved to their closed hook-holding position;

a rotary module mounted to the proximal end of the body for imparting rotary motion to the vise body about its central longitudinal axis; and mounting means attached to the rotary module for attaching the vise to a fixed support.

11. A rotatable vise according to claim 10, wherein the rotary module comprises:

a rotatable spindle operatively connected to the proximal end of the vise body;

an actuating shell disposed about the rotatable spindle in concentric alignment therewith, the actuating shell being rotatable with the rotatable spindle and adapted for limited sliding movement along the rotatable spindle;

a drive assembly operatively connected to the rotatable spindle and the actuating shell for driving the rotatable spindle into rotation when the actuating shell is rotated about its central longitudinal axis; and a disk brake assembly mounted on the rotatable spindle in association with the actuating shell and engageable by the actuating shell whereby movement of the actuating shell along the rotatable spindle in one direction disengages the brake assembly thereby allowing rotation of the actuating shell and rotatable spindle, and movement of the actuating shell along the rotatable spindle in the opposite direction engages the brake assembly thereby locking the actuating shell.

12. A rotatable vise according to claim 10, wherein the mounting means comprises an elongate shaft having a first end attached to the vise body and a second end attached to a base for supporting the shaft in a vertical position.

13. A rotatable vise according to claim 12, wherein the base comprises a clamp for securing the vise to an overhanging edge of the work surface.

14. A rotatable vise according to claim 13, wherein the clamp comprises:

a clamp body slideably receiving the second end of the shaft therewithin;

first and second clamping arms removably mounted to the clamp body in opposed parallel relationship with each other and extending outwardly from the clamp body, each of said clamping arms having a table-confronting face;

a bearing member projecting outwardly from the table-confronting face of said first clamping arm; and a take-up means operatively connected to the bearing member for adjusting the height of the bearing member relative to a surface of the overhanging tabletop edge and for bringing the bearing member into engagement with the tabletop surface to cause said clamping arms to clamp the tabletop.

15. A rotatable vise according to claim 10, wherein the hook engagement jaws have confronting faces and the confronting faces are provided with at least one complementary transverse arcuate groove for receiving and securely holding a fishhook.

16. A rotatable vise according to claim 10, wherein the adjusting shell includes a tapered surface which engages a complementary tapered surface on the hook engagement jaws to urge the jaws into their closed hook-holding position.

17. A rotatable vise according to claim 16, wherein the hook engagement jaws include a transverse groove having a tapered portion for receiving a fulcrum pin, the fulcrum pin being slideable across the tapered portion to urge the jaws into their open hook-receiving position.

18. A rotatable vise according to claim 17, wherein the fulcrum pin includes pin ends that project transversely outwardly of the hook engagement jaws and which are engaged by the adjusting shell so that, as the adjusting shell is rotated in the one direction, it moves the fulcrum pin across the tapered portion thereby urging the jaws into their open hook-receiving position.

19. A rotary module adapted for use with a vise for holding small objects such as a fishing hook, the rotary module comprising:

a rotatable spindle operatively connected to the vise for rotating the vise about its central longitudinal axis;

an actuating shell disposed about the rotatable spindle in spaced apart concentric alignment therewith, the actuating shell being rotatable with the rotatable spindle and adapted for limited sliding movement along the rotatable spindle;

a drive assembly operatively connected to the rotatable spindle and the actuating shell for driving the rotary spindle into rotation when the actuating shell is rotated about its central longitudinal axis; and a disk brake assembly mounted on the rotary spindle in association with the actuating shell and engageable by the actuating shell, whereby movement of the actuating shell along the rotatable spindle in one direction disengages the brake assembly thereby permitting rotation of the actuating shell and rotatable spindle, and movement of the actuating shell in the opposite direction engages the brake assembly thereby locking the actuating shell.

* * * * *